United States Patent [19]

Simasaki

[11] Patent Number: 4,676,411

[45] Date of Patent: Jun. 30, 1987

[54] STOPPER OF LIQUID CONTAINER

[75] Inventor: Masuo Simasaki, Osaka, Japan

[73] Assignee: DIA Vacuum Bottle Industrial Co., Ltd., Osaka, Japan

[21] Appl. No.: 750,492

[22] Filed: Jul. 1, 1985

[51] Int. Cl.$^4$ .......................... B67D 3/00; B67D 5/06
[52] U.S. Cl. ................................... 222/517; 222/518; 222/511; 222/472; 222/509; 215/13 R
[58] Field of Search ............... 222/517, 518, 511, 472, 222/473, 509, 505; 215/13 R

[56] References Cited

U.S. PATENT DOCUMENTS

| | | | |
|---|---|---|---|
| 1,092,101 | 3/1914 | Hansen | 222/518 X |
| 1,645,954 | 10/1927 | Keizer | 215/13 R |
| 2,564,733 | 8/1951 | Sipkin | 222/472 X |
| 3,096,897 | 7/1963 | Hansen | 215/13 R |
| 3,137,417 | 6/1964 | Zetterstrom | 222/472 X |
| 3,172,582 | 3/1965 | Belpedio | 222/473 |
| 3,260,419 | 7/1966 | Weimer et al. | 222/472 X |
| 4,186,855 | 2/1980 | Edman et al. | 222/472 X |
| 4,303,173 | 12/1981 | Nergard | 222/518 X |
| 4,351,451 | 9/1982 | Chung | 215/13 R X |

FOREIGN PATENT DOCUMENTS 2635495 2/1978 Fed. Rep. of Germany .

Primary Examiner—Frank E. Werner
Assistant Examiner—Jay I. Alexander
Attorney, Agent, or Firm—Wenderoth, Lind & Ponack

[57] ABSTRACT

A stopper for a container including a stopper body provided with an inlet port at the lower end thereof and an outlet port communicating with the inlet port at the front end thereof. A guide cylinder extends from a wall above the inlet port within the stopper body and a push rod extends through and beyond either side of the guide cylinder. The push rod is provided with a valve body for opening and closing the inlet port at a lower end thereof and a receiving seat at an upper end thereof. A spring is disposed between the wall above the inlet port and the receiving seat for biasing the push rod upwardly. A lever is arranged to pivot about a hinge positioned in the front part of the stopper body at the same level or below the upper end surface of the push rod when said valve body is in a position at which it closes the inlet port. The lever has a center portion which engages with the upper end surface of the push rod and an actuating portion of the lever projects from a cut-out portion formed in the rear portion of the stopper body. The valve body opens and closes the inlet port in an interlocking relationship with an up and down movement of the lever.

3 Claims, 3 Drawing Figures

STOPPER OF LIQUID CONTAINER

BACKGROUND OF THE INVENTION

FIELD OF THE INVENTION

The present invention relates to a stopper of a liquid container such as a vacuum bottle adapted so that a liquid within the container can be poured out by press down on a lever, which is provided outside the body of the stopper, without the need for unscrewing a stopper mounted on the liquid container.

SUMMARY OF THE INVENTION

It is an object of the present invention to provide a stopper of a liquid container which can be very smoothly operated with a light touch.

In order to achieve this object, a stopper of the present invention comprises a stopper body provided with an inlet port at the lower end thereof and an outlet port communicating with said inlet port at the front end thereof, a guide cylinder extending downwardly from a wall above the inlet port within said stopper body, a push rod extending through and beyond either side of said guide cylinder and provided with a valve body for opening and closing said inlet port at the lower end thereof and a receiving seat at the upper end thereof, a spring disposed between said wall above the inlet port and said receiving seat for biasing said push rod upwardly, and a lever, which is arranged so as to pivot about a hinge positioned in the front part of said stopper body at the same level or below the upper end surface of said push rod when said valve body is in a position at which it closes said inlet port. The lever has a center portion to engage with the upper end surface of said push rod and an actuating portion of the lever projects from a cut-out portion formed in the rear portion of said stopper body. The valve body opens and closes said inlet port in an interlocking relationship with an up and down movement of said lever.

According to the above described construction, since the fulcrum or pivoted connection of the lever sequentially engaging with the upper end surface of the push rod is positioned on the same level as or below the upper end surface of said push rod, the actuating portion of the lever projecting outside the stopper body is positioned above the upper end surface of said push rod.

Accordingly, the lever is pressed down from above and the pressed-down lever is held in a horizontal state when holding a handle by hand whereby the degree of fatigue of the fingers holding the lever can be remarkably reduced, that is to say, the operation can be carried out without becoming tiresome.

In addition, since an oblique downward force component of a force given to the push rod is absorbed in the vertical direction at a point near the actuating portion side of the lever upon actuation of the lever, the light-touch operation of the lever and the descent of the push rod can be carried out without hindrance whereby the valve body can be very smoothly opened.

Furthermore, since the upper surface side of the valve body is adapted to directly engage with the circumferential wall of the lower opening of the inlet port to close the inlet port, the number of parts can be reduced in comparison with that in the conventional stopper of this type whereby the stopper can be more easily and inexpensively assembled.

BRIEF DESCRIPTION OF THE DRAWINGS

The drawings show a preferred embodiment of the present invention, in which.

DESCRIPTION OF THE PREFERRED EMBODIMENT

Figure 1:
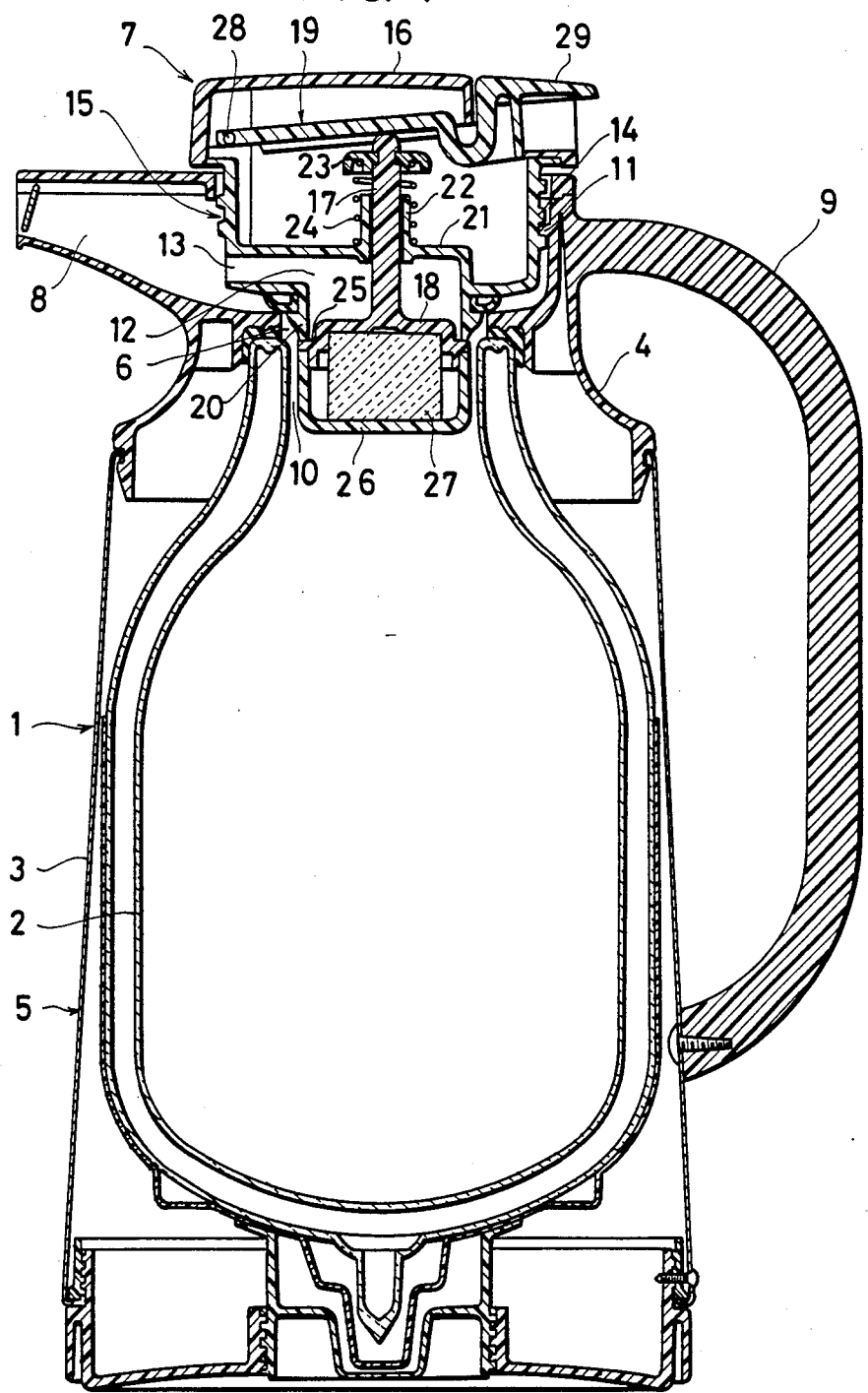
FIG. 1 is a longitudinal sectional view showing the state of an inlet port closed.

The preferred embodiment of the present invention will be described below with reference to the drawings.

1 designates a liquid container comprising a container body 5 provided with a shoulder member 4 at the upper end of an external case 3 surrounding an internal container 2 (double-wall vacuum bottle) and a stopper 7 detachably mounted on a central opening 6 of the shoulder member 4.

Said shoulder member 4 is provided with a liquid-discharge port 8 formed at the front end thereof and a handle 9 at the rear end thereof. In addition, the shoulder member 4 is provided with the central opening 6 communicating with a mouth portion 10 of the internal container 2 formed therewithin. 11 designates a female screw member formed on the upper internal circumferential wall of the shoulder member 4.

Said stopper 7 comprises a stopper body 15 provided with an inlet port 12, an outlet port 13 and a male screw member 14 screwed in said female screw member 11 formed on the upper external circumferential wall thereof, a stopper cover 16 for closing the upper portion of the stopper body 15, a valve body 18 formed integrally with a push rod 17 extending in a longitudinal direction held so as to be movable up and down in the stopper body 15, and a lever 19 arranged so as to be sequentially engaged with the upper end surface of the push rod 17.

Said inlet port 12 is formed on the lower end portion of the stopper body 15, and 20 designates a circumferential wall of the lower portion of the inlet port 12. In addition, said outlet port 13 is formed slightly above the inlet port 12 in the front portion of the stopper body 15 so as to communicate with the inlet port 12.

21 designates an upper wall laterally installed within the stopper body 15 and is provided with a guide cylinder 22 communicating with the inlet port 12 standing thereon. The valve body 18 is arranged so that the push rod 17 may pass through the guide cylinder 22 and held so as to be biased or sequentially pushed upward by the force of a spring 24 provided between a receiving seat 23 fixedly mounted on the upper portion of the push rod 17 and the upper wall 21, whereby the upper circumferential end portion 25 of the valve body 18 is directly engaged with the end surface of the circumferential wall 20 of the lower end portion of the stopper body 15 to close the inlet port 12. 26 designates a lower cap member of the valve body 18. 27 designates an insulant made of urethane rubber and the like.

Figure 2:
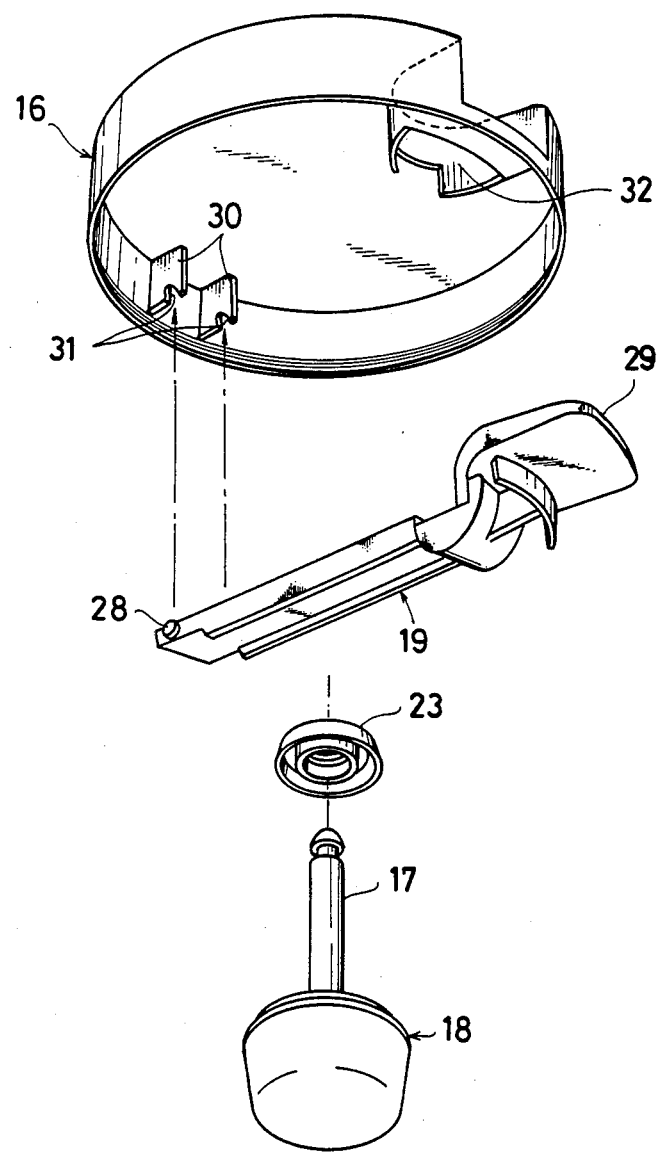
FIG. 2 is a disassembled perspective view showing the installing structure of a lever.

Said lever 19 is, as shown in FIG. 2, formed in flat plate-like shape and provided with a pin 28 projecting therefrom at one end thereof and a pressure-receiving member or actuating portion 29 formed at another end thereof. Said pin 28 is held so as to be pivotally attached in a receiving member 31 of a pin-stopping member 30 formed inside the stopper cover 16 and the pressure-receiving member 29 side of the lever 19 is projected from a cut-out portion 32 formed in the rear portion of the stopper cover 16. The pin 28 and pin-receiving member 30 thus form a hinge for pivoting the lever 19 to the stopper body 15.

The position of the pin 28 as the pivot connection of the lever 19 is, as shown in FIG. 1, set so as to be at a position above the wall 21 in the longitudinal direction no higher than the upper end surface of the push rod 17 or below it when the valve body 18 is at a position for closing the inlet port 12. In addition, the lever 19 may be formed in a rod-like shape. The pivot structure of the lever 19 is not limited to the one shown in FIG. 2.

Figure 3:
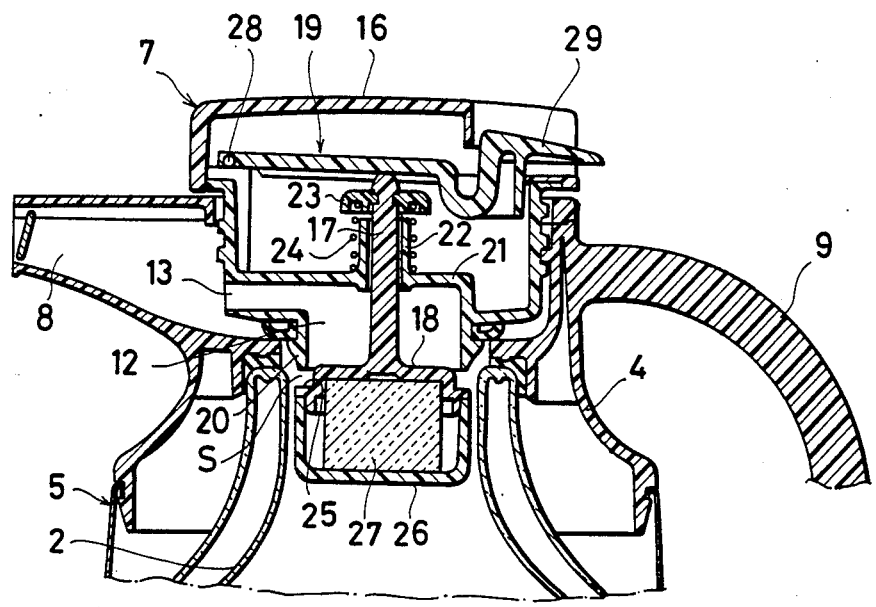
FIG. 3 is a longitudinal sectional view showing the principal parts when the inlet port is under the opened state.

In order to pour the liquid out of the internal container 2, the lever 19 is pushed down by the thumb of a hand which is holding the handle 9. By pushing down on the pressure-receiving member 29 of the lever 19, the push rod 17 is moved downward by the pushing-down force of the lever 19, whereby the upper circumferential end portion 25 of the valve body 18 formed integrally with the push rod 17 is separated from the lower end surface of the circumferential wall 20 of the lower end portion of the stopper body 15 to form a gap S between the valve body 18 and the circumferential wall 20 of the lower end portion of the stopper body 15. In short, since the inlet port 12 communicates with the internal container 2 at the lower side thereof (see FIG. 3), the liquid can be poured into the outside through said liquid-discharge port 8 by inclining the container body 5 toward the side of the liquid-discharge port 8.

What is claimed is:

1. A stopper of a liquid container such as a vacuum bottle comprising:

a stopper body provided with an inlet port at the lower end thereof and an outlet port communicating with said inlet port at the front end thereof, said stopper body including a stopper cover;

a guide cylinder extending from a wall above said inlet port within said stopper body;

a push rod extending in a longitudinal direction through and beyond either side of said guide cylinder, said push rod having a valve body for opening and closing said inlet port at the lower end thereof and a receiving seat at the upper end thereof;

a spring disposed between said wall above said inlet port and said receiving seat for biasing said push rod upwardly; and a lever pivotally attached to an inner surface at one end of said stopper cover at a position above said wall in said longitudinal direction no higher than the upper end surface of said push rod when said valve body is in a position at which it closes said inlet port, said lever having a center portion engaging with the upper end surface of said push rod and said lever having an actuating portion projecting through a cut-out in an opposite end of said stopper cover for actuation of said valve body by a downward force on said actuating portion;

whereby said valve body opens and closes said inlet port with an up and down movement of said lever by lightly pressing the actuating portion of the lever.

2. The stopper of claim 1, wherein said valve body comprises an upper circumferential end portion which closes said inlet portion in said stopper body, a lower cap member extending downwardly from said upper circumferential end portion and an insulant received in a space between said lower cap member and said upper circumferential end portion.

3. The stopper of claim 1, wherein said spring surrounds at least a portion of said guide cylinder.

* * * * *